Figures 1, 2, 3:
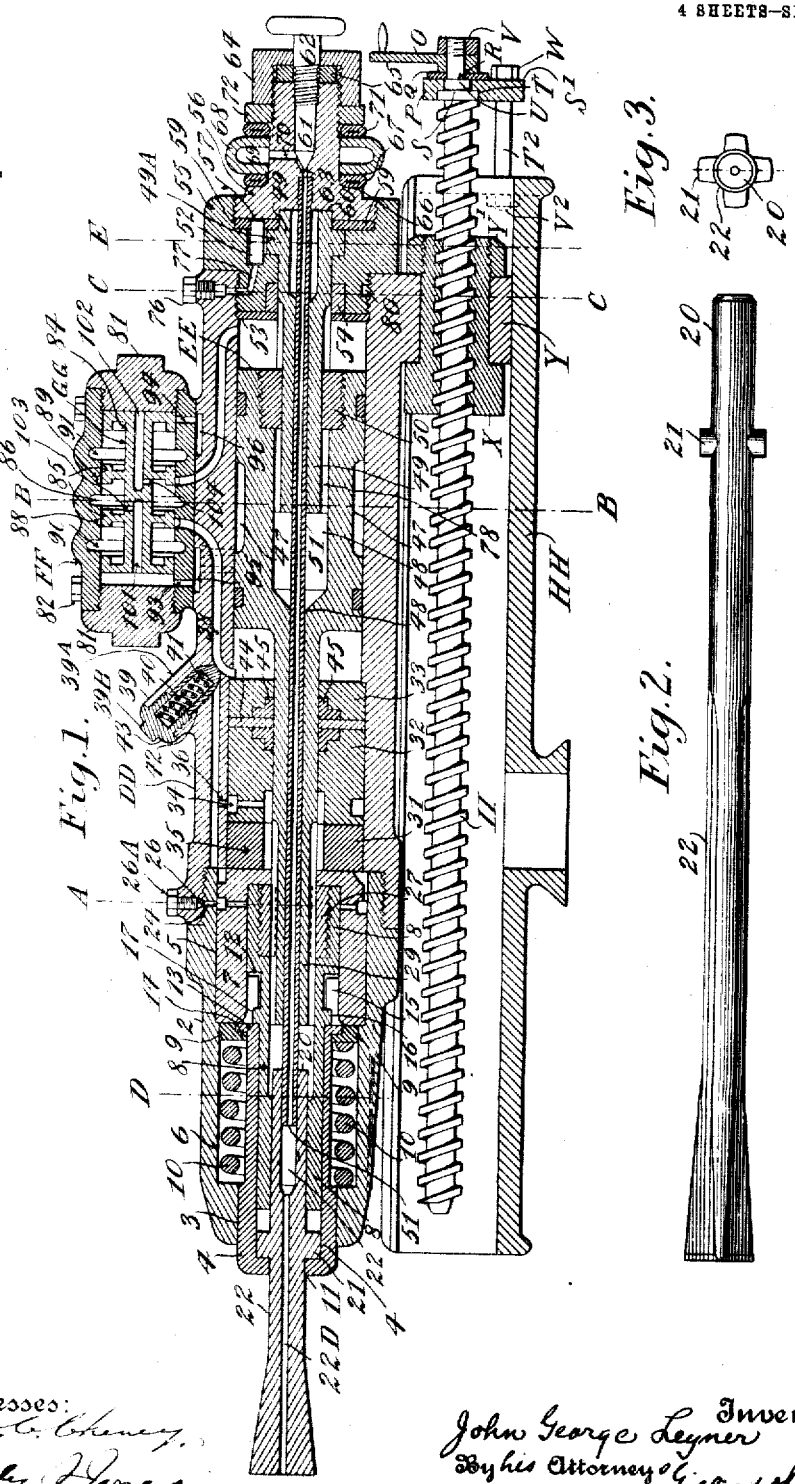

J. G. LEYNER.

ROCK DRILLING ENGINE.

APPLICATION FILED MAY 26, 1913.

Reissued Sept. 9, 1913.

13,614.

4 SHEETS—SHEET 1.

Witnesses:

Geo. E. Cheney

Charles H. Jones

John George Leyner Inventor

By his Attorneys Gifford & Bull

J. G. LEYNER.
ROCK DRILLING ENGINE.
APPLICATION FILED MAY 26, 1913.
Reissued Sept. 9, 1913.
13,614.
4 SHEETS—SHEET 2.
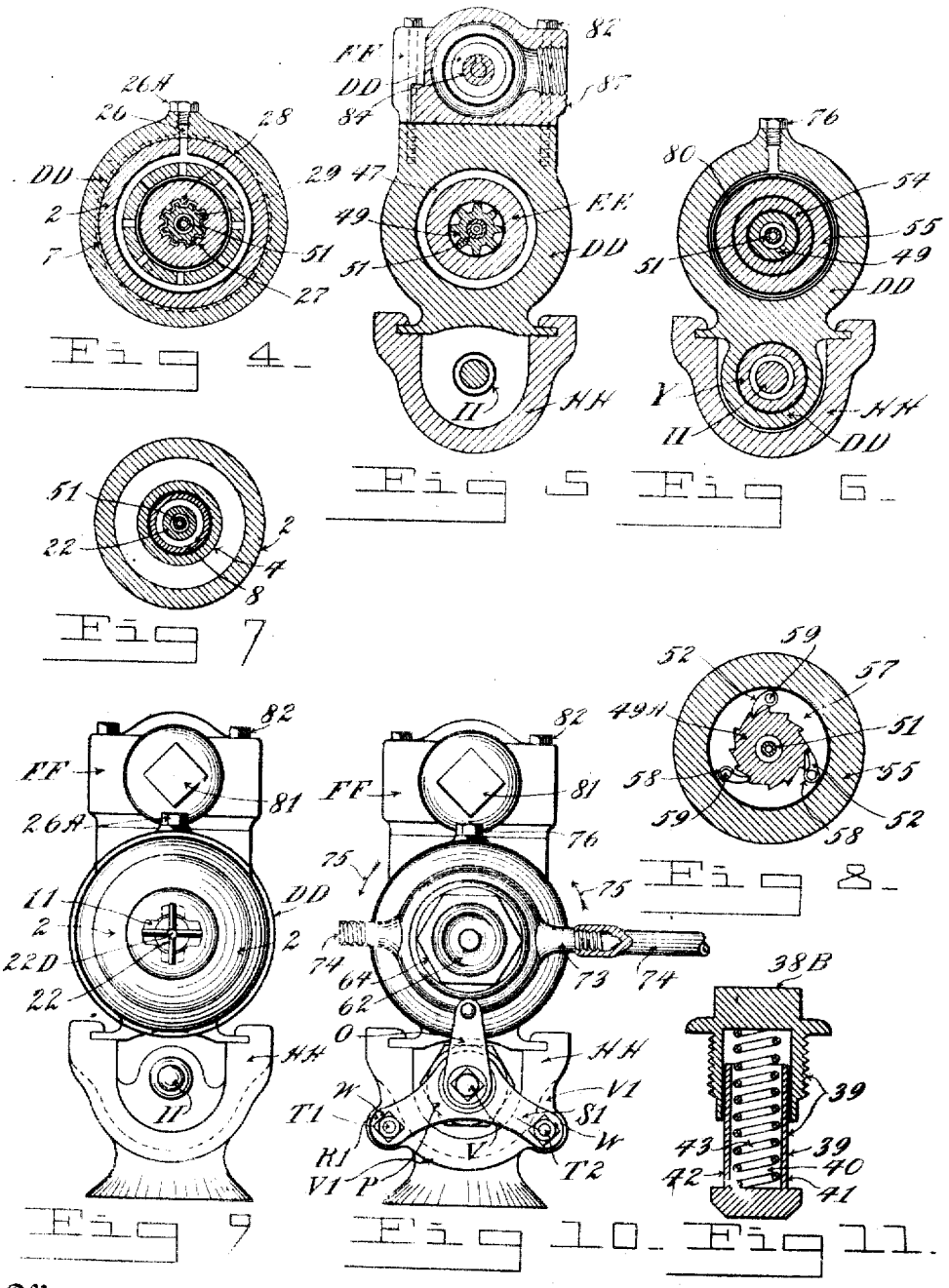
Witnesses:
Geo. A. Chaney
Clare Jones
Inventor
John George Leyner
By his Attorneys
Gifford & Bull J. G. LEYNER.
ROCK DRILLING ENGINE.
APPLICATION FILED MAY 26, 1913.
Reissued Sept. 9, 1913.
13,614.
4 SHEETS—SHEET 3.
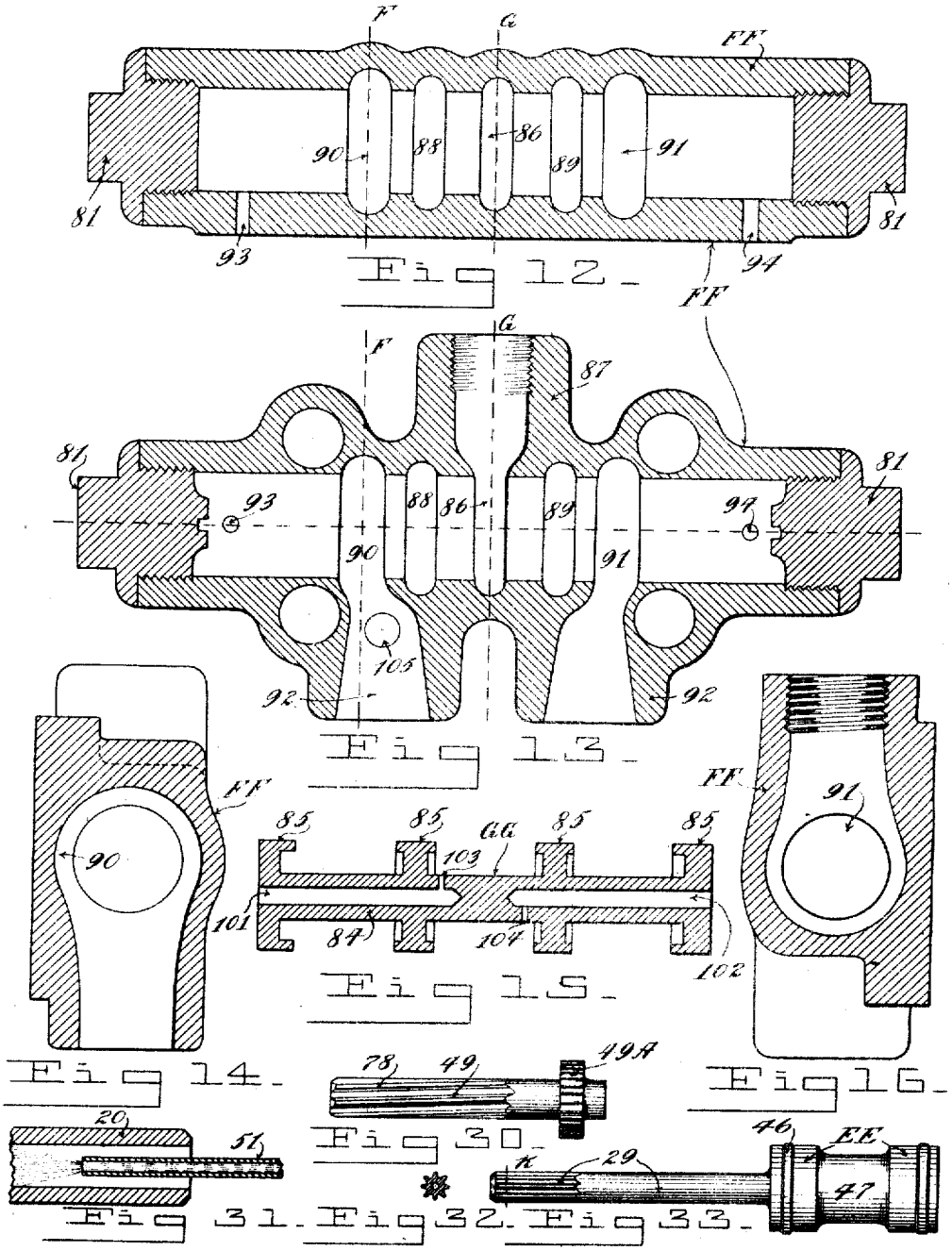
Witnesses:
Charles A. Jones
W. A. Paulding
John George Leyner Inventor
By his Attorneys Gifford & Bull

J. G. LEYNER.

ROCK DRILLING ENGINE.

APPLICATION FILED MAY 26, 1913.

Reissued Sept. 9, 1913.

13,614.

4 SHEETS—SHEET 4.

Witnesses:
Geo. C. Ashburn
Charles A. Jones.

Inventor
John George Leyner
By his Attorneys
Gifford & Bull

UNITED STATES PATENT OFFICE.

JOHN GEORGE LEYNER, OF DENVER, COLORADO, ASSIGNOR TO THE J. GEO. LEYNER ENGINEERING WORKS COMPANY, OF LITTLETON, COLORADO, A CORPORATION OF COLORADO.

ROCK-DRILLING ENGINE.

13,614. Specification of Reissued Letters Patent. Reissued Sept. 9, 1913.

Original No. 651,487, dated June 12, 1900, Serial No. 751,037. Application for reissue filed May 26, 1913. Serial No. 769,817.

*To all whom it may concern:*

Be it known that I, JOHN GEORGE LEYNER, a citizen of the United States of America, residing at Denver, in the county of Denver and State of Colorado, have invented certain new and useful Improvements in Rock-Drilling Engines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in air or steam rock-drilling engines adapted to expel rock cuttings from rocks while drilling them; and the objects of my invention are, first, to provide a rock-drilling engine that will discharge against the bottom of a hole while drilling it a jet of the engine's actuating air or steam combined with a stream of water under pressure; second, to provide means for regulating the flow of the water; third, to provide means for conveying the water through the drilling-engine and its drill-bit and to the drill-bit's cutting-point to the bottom of the hole being drilled; fourth, to provide means for uniting the air and water in the shank of the drill-bit; fifth, to provide means for connecting the water-supply to either side of the engine; sixth, to provide an operating rock-drilling engine in which the drill-bit is stationary relative to the reciprocal movements of the piston and is loosely and non-clampably supported by the drilling-engine and is arranged to be instantly withdrawn therefrom or inserted therein at the will of the operator and that is adapted to be intermittently rotated step by step thereir by the reciprocating and intermittent rotary movement of the piston and which is adapted to convey a portion of the piston's actuated fluid from the engine's cylinder combined with a jet of water to the bottom of holes while drilling them, and, seventh, to provide a rock-drilling engine adapted to drive the rock cuttings from holes while drilling them and to lay the rock-dust formed by the drill-bit while cutting or drilling into rock. I attain these objects by the mechanism illustrated in the accompanying drawings, in which—

Figure 17:
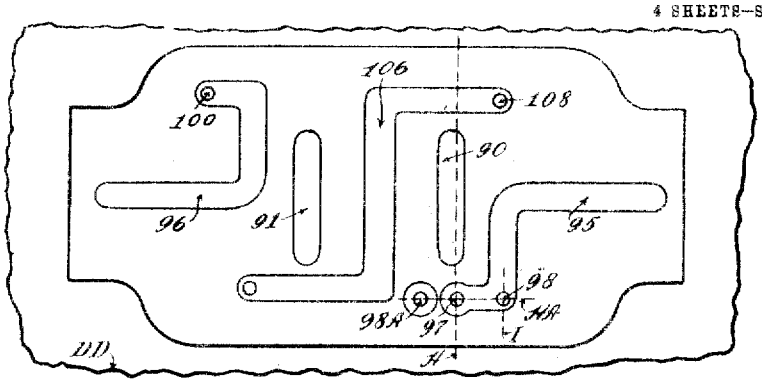
Figure 18:
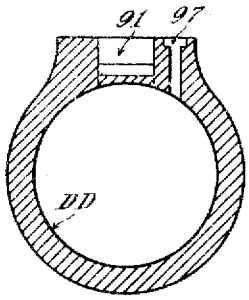
Figure 20:
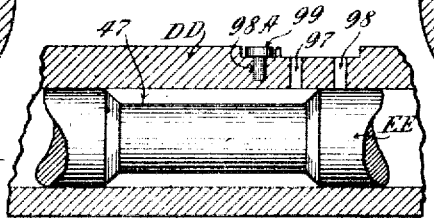
Figure 19:
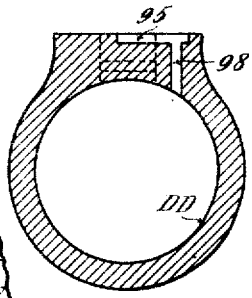
Figure 21:
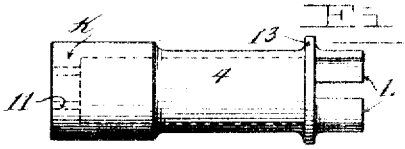
Figure 22:
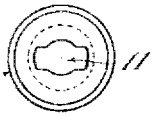
Figure 23:
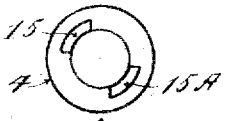
Figure 24:
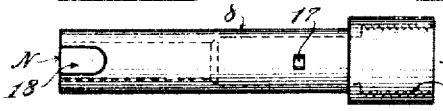
Figure 25:
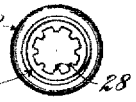
Figure 26:
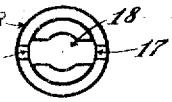
Figure 27:
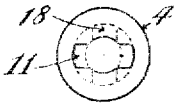
Figure 28:
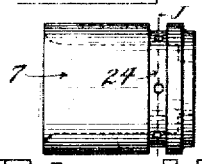
Figure 29:
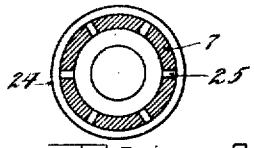

Figure 1 is a central longitudinal section of an air or steam rock-drilling engine embodying my invention. Fig. 2 is a side elevation of the rock-cutting drill-bit of my improved rock-drilling engine. Fig. 3 is an end view of the shank end of the drill-bit. Fig. 4 is a cross-section of Fig. 1 on line A. Fig. 5 is a cross-section of Fig. 1 on line B. Fig. 6 is a cross-section of Fig. 1 on line C. Fig. 7 is a cross-section on line D. Fig. 8 is a cross-section of Fig. 1 on line E. Fig. 9 is an end elevation of the front or drill-bit holding end of the drilling-engine. Fig. 10 is an end elevation of the rear or feed end of the drilling-engine. Fig. 11 is an enlarged central section of the air-inlet valve. Fig. 12 is a full-size sectional view of the valve-chest. Fig. 13 is a full-size central plan view of the valve-chest. Fig. 14 is a cross-section of Figs. 12 and 13 on line F. Fig. 15 is a longitudinal sectional view of the main valve. Fig. 16 is a cross-section of Figs. 12 and 13 on line G. Fig. 17 is a top plan view of the cylinder-seat of the valve-chest. Fig. 18 is a cross-section on line H of Fig. 17. Fig. 19 is a cross-section on line I of Fig. 17. Fig 20 is a fragmentary sectional view of the valve-chest's seat, showing a fragment of the piston in the cylinder on line II A of Fig 17. Fig. 21 is a side elevation of the drill chuck-sleeve. Fig. 22 is an end elevation of the end K of Fig. 21. Fig. 23 is an end elevation of the end L of Fig. 21. Fig. 24 is a side eleyation of the drill's chuck. Fig. 25 is an end elevation of the end M of Fig. 24. Fig. 26 is an end elevation of the end N of Fig. 24. Fig. 27 is an end elevation of the chuck-sleeve and the chuck, showing the oblong holes at right angles to each other, in which the drill-bit rests. Fig. 28 is a side elevation of the chuck-bearing ring. Fig. 29 is a cross-section of Fig. 28 on line J. Fig. 30 is a side elevation of the rifle-bar. Fig. 31 is an enlarged fragmentary sectional view of the water-tube and the shank of the drill-bit. Fig. 32 is a section of Fig. 33 on line K, and Fig. 33 is a side elevation of the piston and its hammer-bar.

Similar letters and figures of reference refer to similar parts throughout the several views.

Referring to Fig. 1, D D designate the cylinder, E E the piston, F F the steam-chest, G G the valve, H H the guide-shell, in which the cylinder is slidably mounted, and I I the feed-screw, of a rock-drilling engine. The drill-feeding mechanism comprises the screw I I, the operating-handle O, the flange P, and a washer Q, which bears against a shoulder R, formed on the screw. The screw is also provided with a collar S, which projects into a recess T, formed in the flange. This collar takes the backward thrust of the screw. The handle O is screwed against the washer Q, which bears against the shoulder R, and the round portion U of the screw, between the shoulder and the collar, is made a little wider than the surrounding bearing of the flange, so that the screw can rotate freely in the flange. On the end of the screw, beyond the handle, I screw a nut V tightly against the handle. The feed-screw-supporting flange P is provided with two opposite laterally-extending ears R′ and S′, by which it is bolted to the main guide-shell of the drilling-engine by the bolts T′ and $T^2$. These bolts pass freely through the ears and the flange V′ of the guide-shell and are secured there by nuts $V^2$ and W, which are threaded to their ends and which are tightened against the side of the lugs and flange. The feed-screw is threaded through a nut X, which is rigidly supported in a depending lug Y, formed on the bottom of the cylinder D D. This nut is clamped in said lug by a nut Y′. The cylinder is provided with a front cylinder-head 2, which is threaded to the end of the cylinder. This front cylinder-head contains an axial bore 3 in its front end, in which fits a drill-bit-holding chuck-sleeve 4. The front cylinder-head also contains a counterbore 5 of larger diameter, which is bored into it from its cylinder end a portion of its length, where it intersects a third counterbore 6, which is smaller in diameter than counterbore 5 and extends to and intersects counterbore 3. I place in the large counterbore 5 a steel ring 7, which I call a "chuck-ring" and which fits up against the shoulder formed by the intersection of the counterbores 5 and 6. This chuck-ring forms a bearing for the chuck 8, which fits revolubly in it and also extends loosely into the chuck-sleeve. Against the inner ends of this chuck-ring I place a thin steel ring 9, and between this ring and the shoulder, at the intersection of the two counterbores 3 and 6, I place a coiled spring 10. The drill-bit-holding chuck-sleeve fits slidably and rotatably in the smaller counterbore 3 and extends out beyond the end of the cylinder-head far enough to be clasped by the hand of an operator, and in order that the sleeve may be firmly held by the hand the external surface is knurled or fluted. This sleeve extends under the spring and under the adjacent edge of the chuck-ring. The outer end of the chuck-sleeve is introverted to form an end flange through which is formed an elongated hole 11. The opposite end of the chuck-sleeve extends to a shoulder 12, formed on the chuck, and adjacent to this end a collar 13 is formed which fits in a rabbeted edge 14, formed in the inner peripheral edge of the ring 9. Between the collar and the adjacent end of the chuck-sleeve the metal in the sleeve is cut away on opposite sides to leave two diametrically opposite portions or spurs 15 and $15^a$. Each of these spurs contains about one-quarter of the metal in the circumference of the sleeve and each extends axially and parallel with one another from the collar. These projecting spurs of metal are clearly illustrated in Figs. 21 and 23. They act as stops for the chuck-sleeve when a manual rotative movement is given the chuck-sleeve, which is necessary in order to lock the drill-bit in place, as will be described more fully hereinafter. These spurs engage two diametrically oppositely disposed lugs 16 and 17, which project from the surface of the chuck 8, contiguous to the collar 13. The outer end of the chuck 8 contains a slot 18, formed diametrically across its end, as shown in Fig. 24. This chuck extends up to the end flange of the chuck-sleeve. The slot in the chuck and the elongated hole in the end of the chuck-sleeve are formed to receive loosely the shank 20 and the lugs 21 of the rock-cutting drill-bit 22. The slot in the chuck is made enough longer than the lugs on the drill shank to allow the drill-bit about a half-inch longitudinal feed movement.

The rock-cutting drill-bits may be made with one, two, three, four, or more cutting-lips; but I preferably use cross-shaped steel and make four cutting edges, as shown in Fig. 2. The shank is preferably round, although other forms may be used. The drill-bit is provided through its center with an axial hole $22^a$, or, if preferred, a closed conduit or a closed passage of any suitable character may be arranged along its sides. As illustrated, a hole of two diameters is shown. This is not necessary, as a hole of even diameter will do. It is only necessary that the water-tube project very freely into its shank end. At a short distance from the end of its shank end two projecting diametrically oppositely arranged lugs 21 are formed. The end of the shank and these lugs are adapted to fit loosely in the oblong slots of the chuck-sleeve and chuck as they are inserted through the chuck-sleeve into the chuck; but in order to insert them and the drill-shank into the chuck it is first necessary to turn the chuck-sleeve until its oblong hole comes in line with the oblong hole in the chuck. Then the drill-shank can be inserted until its lugs occupy the slots in the chuck. The chuck-sleeve is then turned at right angles to the slots in the chuck, as shown in Figs. 9 and 27, at which points its spurs 15 and 15[a] strike the projecting lugs 16 and 17 of the chuck. The chuck-sleeve is arranged to be moved very freely in the cylinder-head and on the chuck at all times by the hand of the operator, so that a drill-bit may be taken out and inserted at any time, and it turns with the drill-bit as it rotates step by step when drilling rock, as will be fully described hereinafter. The chuck-ring 7 has an inverted flange at its end nearest the cylinder, which extends down over the end of the chuck. An oil-groove 24 is also cut around the periphery of the ring, and in the groove through the shell several holes 25 are drilled, which allow the oil to flow to the chuck and its adjacent parts. This oil-groove registers with a hole 26, drilled through the overlapping ends of the cylinder-head and the cylinder. A cap-screw 26[A] is threaded to the entrance of the oil-hole. In the inner end of the chuck I thread a nut 27, which contains an axial hole, in the peripheral wall of which I form a number of straight parallel flutes 28, through which reciprocally slides the hammer-bar 29 of the piston. This hammer-bar is an integral part of the piston, and its end is fluted with straight parallel flutes 28[A] to fit freely in the flutes of the nut. Surrounding the hammer-bar there is a series of rings 31, 32 and 33. The ring 31 is a rubber buffer-ring and bears against the end of the chuck-ring, and the ring 32, which is a metal ring, bears against the ring 31. This ring contains a circumferential groove 34, from which holes 35 extend through the shell of the ring. This peripheral groove registers opposite a passage or port 36, formed in the internal periphery of the cylinder, and bisects a port 37, drilled axially through the top of the cylinder into the port 38, which leads from the valve-chest and its ports into the cylinder. At the junction of the port 37 and 38 I place an automatically opening and closing valve 39, which I arrange to normally keep the port 37 closed. This valve comprises a tubular boss 39[A], extending upward from the cylinder. A cap 39[B] is threaded to the interior of the tube. The valve 40 consists of a stem 41, containing an axial hole 42, extending into it to near its seat end. Its seat end is formed to register against a seat formed in the cylinder in a position to control the port 37. A coiled expansion-spring 43 is placed in the stem of the valve and between it and the cap and normally holds the valve closed. I place a steel ring 44 between the ring 32 and the ring 33, which is also a metal ring, and on each side of this steel ring I place a cupped washer 45, made, preferably, of leather, constructing them to bear on the hammer-bar of the piston, cutting out the rings, so that they will fit snugly over the cupped washers and bear against the steel ring. These rings, with the rubber buffer-ring, fit in a counterbore in the end of the cylinder which is larger than the piston-bore of the cylinder, and all these rings, together with the chuck-ring, are pressed together between the shoulders of the counterbore of the cylinder and cylinder-head at the opposite ends of the group of rings when the cylinder-head is screwed onto the cylinder. The piston contains cylinder-rings 46 near each end and at its center a circumferential groove 47.

Axially through the piston and its hammer-bar I drill a hole 48 of two diameters. The larger hole extends from the rear end of the body of the piston nearly through it and receives loosely the rifled end of a rifle-bar 49, which projects through a rifled nut 50, that is threaded in the end of the piston. The smaller hole passes through the hammer-bar and surrounds loosely a water-conveying tube 51. This tube also extends loosely through the rifle-bar. The rifle-bar contains a ratchet-head portion 49[A] at its end opposite the rifled portion, which is surrounded by three pawls 52. This rifle-bar 49, its pawls 52, which are shown in Figs. 1 and 8, the rear steel buffer-ring 53, and the rubber buffer-ring 54 are supported in a supplementary cylinder-head 55, which is threadedly secured in a counterbore in the rear end of the cylinder. This supplementary head contains a chamber in which the said rubber buffer is seated, and the steel ring is placed at its side at the bottom of the counterbore in the end of the cylinder. The opposite side of the supplementary cylinder-head is chambered out to hold the ratchet-head of the rifle-bar and the pawls. This rifle-bar and ratchet mechanism is used for turning the rock-cutting drill bit through the medium of the piston and adjacent parts and is in common use in rock-drilling engines for this purpose. My invention, however, contemplates the use of any suitable rifle-and-pawl mechanism, although I preferably use that shown in Letters Patent of the United States No. 583,089. The supplementary cylinder-head 55 and the rear cylinder-head 56 have formed between them an annular recess in which is fitted loosely a flat ring 57, in which I drill three holes which form supporting-bearings for the adjacent trunnions 59 of each pawl. Three pawls are used around the ratchet-head of the rifle-bar, substantially as shown in Fig. 8, and are used to lock the rifle-bar against rotary movement in one direction, and coöperatively with the rifle-bar they operate to rotate the piston step by step as it reciprocates in the cylinder. An axial recess is also formed in the rear cylinder-head around the tube 51 to support the hub 60 of the ratchet-wheel. The rear cylinder-head 56 in Fig. 1 is threaded to a counterbore in the end of the supplementary cylinder, and it is necessary in order to screw it on that the adjacent trunnions of the pawls have a bearing independent of the cylinder-head and one that will remain stationary while the cylinder-head is being screwed into place. The rear cylinder-head comprises a flanged head portion with a round body portion a trifle longer than its diameter, which is axially bored out from its outer end to form a valve-chamber. This valve-chamber is internally threaded to receive a threaded plug-valve 61, which is provided with a small hand-wheel 62 at its outer end. Its inner end is pointed to form a plug-valve, and the bottom of the valve-chamber is beveled to form a seat for the valve end of the plug. Axially through the valve-seat a hole 63 is drilled from the valve-chamber through the cylinder-head into the water-tube, and the plug-valve is adapted to be screwed to and from the valve-seat and to control the passage from the valve-chamber to the water-tube. A gland 64 is mounted on the plug-valve and is threaded to the end of the cylinder-head, and packing 65 is placed in the gland to prevent the leakage of water by the valve. A shoulder 66 is formed by a portion that blends from the flange-head, which is larger in diameter than the portion upon which the gland is mounted, and against this shoulder, around the cylinder-head, is placed a washer 67. The washer illustrated preferably comprises a flat rubber ring covered with copper. At the side of the washer 67 I mount to turn freely a coupling 68, which is provided with an annular chamber 69. Through the shell of the cylinder-head a hole 70 is drilled into the valve-chamber and forms a passage for the coupling to it. At the sides of the coupling a washer 71 is placed, and a nut 72 is threaded to the cylinder-head at the side of the said washer, which is adapted to be screwed against the washer to compress the coupling and washers against the said shoulder and each other tightly enough to prevent leakage of the water from the coupling. One side of the coupling is provided with a projecting threaded nipple 73, to which a hose 74 is secured. The hose connects the coupling with any suitable supply of water or with any suitable watery liquid under pressure enough to give the liquid operative power to eject the rock cuttings from the holes. By slightly loosening the nut 72 the coupling may be turned on the cylinder-head, as indicated by the arrows 75, so that the hose of the water-supply may be connected to either side of the drilling-engine as required. I thread a cap-screw 76 in the end of the cylinder over the supplementary cylinder-head and drill the cap-screw hole into the supplementary head and also drill a second hole 77 from the adjacent recess of the pawl's trunnions to intersect it. These holes form an oil-passage to the pawls and ratchet. The oil placed in them also works along the rifle-bar to the rifle-nut in the piston-head. This nut is fluted to slide freely on the rifles 78 of the rifle-bar 49. A similar groove 80 is cut in the threads of the supplementary cylinder-head 55, which registers with the oil-hole in which the cap-screw 76 is threaded. The valve-chest F F has a cylindrical bore, and at its ends cylinder-heads 81 are threaded to it. These are provided with a wrench-receiving hub, by which the heads can be readily screwed on or from the valve-chest. The valve-chest is secured to the cylinder by the cap-screws 82.

My invention contemplates the use of any suitable form or type of valve and any arrangement of valve-ports or exhaust-ports which, through the medium of any expansive fluid, will automatically operate the valve and piston. I preferably construct the valve and ports, however, in the following manner: The valve-chest F F contains a cylindrical valve-chamber, and a cylindrical valve G G is fitted snugly but loosely to it and reciprocates in it. The valve comprises a stem 84, which contains four collar portions 85, which are so disposed as to cover operatively a corresponding number of ports, which comprise circumferential recesses formed in the valve-chamber of the chest. The port 86 is an air-inlet port (see Figs. 1, 12, 13, 14, 15, and 16) and connects with the air-inlet boss 87, to which a pipe or hose leading from a compressed-air supply is connected. The ports 88 and 89 lead to opposite ends of the cylinder. The ports 90 and 91 are exhaust-ports and connect with the outlet holes in the discharge-bosses 92, from which the air discharges. At opposite ends of the valve-chest small holes 93 and 94 are drilled through its seat portion on the cylinder from its valve-chamber. These holes connect with recesses 95 and 96, milled in the surface of the valve's seat on top of the cylinder. These recesses extend first down the center of the seat and then branch off at right angles to near the edge of the seat and then turn and extend parallel with the axis of the cylinder. They turn in opposite directions from the center; but at the second turn they extend longitudinally along the seat in the same direction. Their exact position is not very particular, they being placed in the path of the circumferential groove in the center of the piston, so as to let the air out of the ends of the valve-chest. In the recess 95 there are two holes 97 and 98 (see Figs. 17 and 20) at about seven-sixteenths of an inch apart. These are placed beyond the end of the adjacent main cylinder-port. Adjacent to these two holes a third hole 98^ is drilled, which does not extend through into the cylinder, but acts as a keeper of a pin 99, which fits loosely in it. The recess 96 contains a hole 100, which extends into the cylinder. The valve contains holes 101 and 102 in each end, both of which extend inside the two central collars, where small holes 103 and 104 are drilled through the stem into the end holes.

105 is an exhaust-hole in the valve-chest.

106 designates a recess milled in the seat. It is placed between the main cylinder-ports and has two right-angled L's, that pass around the ports, in the end of which there are holes 107 and 108, drilled into the cylinder. These holes also lie in the paths of the circumferential groove in the center of the piston as the piston reciprocates. The exhaust-hole 105 fits over either one end or the other of this recess, depending on which way the valve is set on the cylinder, as it is made to be reversed end for end.

The operation of the valves and ports is as follows: The air enters the center of the chest between the center collars of the valve and is free to flow to the ends of the valve through the holes that lead through the stem to them. Consequently if the piston is in a position to cover both holes 97 and 100 the valve is balanced: but the air leaks through the holes 93 and 92 and through the recesses 95 and 96 and holes 97, 98, and 100 and flows to the circumferential groove around the piston and from it flows through whichever one of the holes 107 or 108 the piston's groove is nearest to into the recess 106, from which it flows through the hole 105 to the atmosphere. This action relieves the pressure of air from one end on the other end of the valve, and the pressure on the opposite end causes it to move its stroke in one direction in the cylinder. The two holes 97 and 98 in the recess 95 are used to give two different strengths of blows to the piston. Thus when the pin is taken out of its keeping-hole and placed in the hole 97 this hole is closed, and as the hole 98 is nearer to the end of the cylinder and the farthest from the piston-groove the pressure on the adjacent end of the valve is not relieved as quick as if the hole 97 were open. Consequently the piston is not cushioned but slightly and travels practically its full stroke, and consequently strikes a harder blow forward.

The operation of my improved rock-drilling engine is as follows: The actuating fluid is admitted to the valve-chest F F and to the valve and operates through the medium of the coöperating ports in the valve and chest and cylinder to automatically reciprocate the valve in the chest and the piston in the cylinder in a well-known manner. The piston is turned step by step as it is reciprocated by sliding spirally on the rifle-bar, which is held against turning in one direction by its pawls. The piston as it reciprocates strikes with its hammer-bar on the end of the drill. The drill-bit and drilling-engine should be fed by the operator through the medium of the feed-screw I I to keep the cutting end of the drill against or close to the rock. The drill and rock receive the full force of the blow of the piston and its hammer-bar. The recoil of the drill-bit from the blow of the piston will move it back a slight distance from the rock, where it can be easily turned step by step through the medium of the piston, the rifle-bar, the fluted hammer-bar of the piston, and the fluted nut and chuck, for the piston turns the fluted nut and chuck, and the chuck turns the drill cutting-bit. At each stroke of the piston a portion of the air that flows through the front port 38 raises the automatic valve and flows through the port 37 and ring 32 to the flutes of the hammer-bar of the piston and through the fluted nut inside the chuck and around the water-tube into the end of the drill-bit, where it mingles with the water. The water should preferably be under pressure enough to flow to and through the drilling-engine and drill-bit without causing back pressure on the actuating fluid mingling with it. The water-supply pipe or hose is connected to the coupling, and the water flows through it into the valve-chamber, and from the valve-chamber into and through the tube into the shank of the drill-bit and mixes and commingles with the actuating fluid of the cylinder as they both flow through the drill-bit together. It is not necessary that the air should be disseminated through the water. It may even combine with it in the form of independent piston-like sections of air as they both flow along. The water flows in a steady stream; but the size of the stream can be regulated, and preferably is so regulated by the plug-valve, and can be reduced to a size that when mingled with air will result in a spray which is discharged in puffs from the drill-bit in the bottom of the hole immediately after each blow of the piston against the drill-bit and of the drill-bit against the rock and allays the dust as well as drives the rock-cuttings from the hole. Some kinds of rock will require more water than a spray would give, but any amount of water can be combined with the air and may be discharged in a steady stream if necessary, as its volume can be regulated by the plug-valve. The reciprocative action of the piston in its hammer-bar and the intermittent exhaust of the air from the front end of the cylinder has a tendency to draw a little water into the cylinder on the back stroke of the piston by suction, especially as the water flows steadily into the drill-bit; but the cupped washers maintain an operative water seal around the hammer-bar of the piston sufficiently tight to keep any harmful quantities of water out. The valves and ports are arranged so that when the drill is running the piston will cushion on its rear stroke on air without striking the rear ring; but the piston strikes the front ring 33 when a drill-bit is not in the chuck. The blows on the ring 33 have the effect of keeping the cupped washers bearing snugly around the hammer-bar. A harmful quantity of water in the cylinder carries off the lubricating-oil and weakens the blow of the piston as well as allowing the piston and cylinder to wear faster. When the point of the drill-bit is not in operative striking relation to rock, the piston's hammer-bar strikes against the end of the drill-bit and drives it forward in the chuck until its lugs strike the end flange of the chuck-sleeve and the chuck-sleeve jumps forward under each blow; but as the collar on this sleeve is connected to the ring at the end of the coiled spring the ring and spring are also moved forward by the blows on the shank of the drill-bit, and the spring is compressed and the blows are thus cushioned. Consequently no severe blows are struck by the piston against the ring nearest the cupped washers. When, however, the drill-bit is against or close to rock in drilling, the cylinder is fed by the feed-screw, to keep the lugs of the drill-bit from a quarter to one-half inch from the flanged end of the chuck-sleeve. Then the blows of the piston will drive the drill-bit against and into the rock, and if the cylinder is fed properly there will always be ample clearance between the lugs and the flanged end of the chuck-sleeve.

My invention contemplates a controllable supply of water under pressure flowing to the cutting-point of the drill-bit. In practice I use a small tank. One of about eighteen gallons capacity is large enough for each drill. I place this tank at a convenient distance from each drill and keep it well supplied with water and connect it direct with the air-compressor or air-supply system and also connect the tank to the drilling-engine by hose-pipe. The rock-cuttings are a source of great annoyance in drilling rock, as they clog the drill-bit and strain the turning mechanism of the drill-bit. They also prevent by packing between the cutting-point of the drill and the rock the drill's cutting as fast as it would if they were removed. The cutting edge of a drill will also wear longer if the hole is kept free from cuttings. All rock-drilling engines at present in use are of the type known as "plunger" drilling-engines. They derive this name from the fact that the drill-bits are removably clamped or bolted or otherwise tightly secured to an extension of the piston-head called the "plunger," which extends through and beyond the cylinder and reciprocates through it and is reciprocated and impinged by the piston against the rock, and it is necessary in a plunger-drill every time the rock-cuttings are removed from a hole being drilled to move the drill-bit out of alinement with the hole in order to insert a spooning-tool to remove them and afterward to reset and clamp the drill-bit in line with the hole. By my present invention I am enabled to change the drill-bits very quickly, as they rest loosely in the sleeve. I am also enabled in my new type of drilling-engine, first, to save time in changing drill-bits; second, to effect a saving in the wear and dressing of the drill-bit; third, to get a more effective blow on the drill-bit from the piston; fourth, to cut as large a hole and cut it as fast or faster with fully fifty per cent. less air than a plunger-type drilling-engine of the same-sized cylinder. My new type of drilling-engine strikes about twelve hundred blows per minute and weighs about one-half as much as a plunger-type drill of similar-sized cylinder.

While I have illustrated and described my preferred method and apparatus for expelling rock-cuttings from holes while drilling them, I do not wish to be limited to the construction and arrangement shown, but claim the right to use any and all arrangements by which a portion of a rock-drilling engine's actuating fluid and a supply of water or a watery liquid is conveyed to or adjacent to the cutting-point of the drill-bit and to the bottom of holes in rock while drilling them.

Having described my invention, what I claim as new, and desire to secure by Letters Patent, is—

1. In a rock-drilling engine, the combination with the cylinder and the piston, of a front cylinder-head comprising an integral cylindrical member adapted to be threaded to the end of said cylinder, an axial bore through said head, a counterbore at its inner end, a chuck-bearing ring rotatably seated in said bore, and a drill-holding chuck rotatably mounted in said chuck-ring, substantially as described.

2. In a rock-drilling engine, the combination with the cylinder, the piston and the cylinder-head, of a rotatable chuck-ring, axially supported in said cylinder-head, and a drill-holding chuck supported by said chuck-ring, with a rock-cutting drill-bit loosely supported in said chuck, and having the shank extending into said chuck and adapted to be impinged by the reciprocative movement of the piston, substantially as described.

3. In a rock-drilling engine the combination with the cylinder, the piston, and the front cylinder-head having an axial bore, a larger counterbore adjacent to its cylinder end, a chuck-ring in the counterbore of said cylinder-head, a second counterbore intermediate of said axial bore and said first-named counterbore, a steel ring bearing against the outer end of said chuck ring, a spring in said second counterbore between said steel ring and a shoulder formed in said cylinder-head, a drill-holding chuck rotatably mounted in said chuck-ring; a drill-bit adapted to be held loosely by said chuck, and a chuck-sleeve rotatable in said axial bore of said cylinder-head and adapted to be manually turned to lock said drill-bit loosely and removably to said chuck, substantially as described.

4. In a rock-drilling engine the combination with the cylinder and the piston, of the front cylinder-head, the chuck-ring therein, the chuck supported by said chuck-ring; the chuck-sleeve surrounding the chuck and extending beyond the end of said cylinder-head far enough to be turned by the hand of an operator, the spring and the spring-ring, substantially as described.

5. In a rock-drilling engine the combination with the cylinder and the piston, of the front cylinder-head, the chuck therein, the chuck-ring for supporting the same; a fluted nut in the end of said chuck, a hammer-bar forming an extension of said piston and having a fluted end fitting the fluted nut in said chuck; a drill-bit loosely supported by said chuck and extending into the reciprocating path of said piston and means for manually locking and for unlocking said drill-bit to and from said chuck, substantially as described.

6. In a rock-drilling engine the combination with the cylinder and the piston, of the front cylinder-head, a drill-holding chuck rotatably supported axially therein, a drill-bit operatively supported by said chuck, means for manually locking said drill-bit to and for unlocking it from said chuck and means connected with the said piston for rotating or turning said chuck and drill-bit step by step, substantially as described.

7. In a rock-drilling engine the combination with a cylinder, a piston, a valve-chest and valve and a front cylinder-head, of a rock-cutting drill-bit having an axial hole through it from end to end; a water-conveying tube extending into said drill-bit and arranged and adapted to deliver a supply of water under pressure; a supply of air flowing from said valve-chest to said drill-bit and mingling with and flowing with said water to the bottoms of holes in rock while drilling them, and an automatically opening and closing valve arranged and adapted to be opened and closed by the pressure of the air and to allow only a suitable amount of air to flow to the drill-bit, to eject, when combined with said water, the rock-cuttings from the hole being drilled, substantially as described.

8. The combination in a rock-drilling engine of the cylinder, the piston, the front cylinder-head and the drill-holding chuck and chuck-sleeve with a drill-bit adapted to be operatively supported by said chuck and chuck-sleeve and having a shank and two oppositely-arranged projections formed on said shank near its end and an axial perforation through said drill-bit and means connected with said chuck and chuck-sleeve for rotating said drill-bit step by step, substantially as described.

9. In a rock-drilling engine the combination of the cylinder, the piston, the cylinder-head, the chuck-ring mounted in said cylinder-head, and the chuck and chuck-sleeve, with a drill-bit of any form of cross-section, having a striking end adapted to fit freely in said chuck and arranged to be operatively impinged by and intermittently rotated by said piston, a projection at substantially diametrically-opposite points, adjacent to said drill-point's striking end, adapted to loosely lock said drill-bit rotatably to said chuck and against longitudinal displacement from said chuck and chuck-sleeve, and a passage or conduit from the striking end of said drill-bit to its cutting-point adapted to convey a portion of the piston's actuating fluid from said cylinder to the cutting-point of said drill-bit and to the bottom of the hole being drilled, substantially as described.

10. In a rock-drilling engine, a piston having an extension bar, a rock-drill bit having a drill shank of any merchantable form of cross-section and having a cutting-point of any desired form, a shank end adapted to be struck by the extension bar of said piston, a lug or shoulder adjacent to said end and a closed passage arranged to form part of said drill-bit extending from its striking end to its cutting-point, the front wall of the piston chamber through which the extension bar reciprocates, the cylinder head, the chuck and chuck sleeve therein coöperating with said lug or shoulder, said extension bar having a splined connection with said chuck.

11. In a rock-drilling engine a rock-cutting drill loosely positioned and supported in the drilling-engine and arranged to be impinged upon one end by a reciprocal movement of the piston, an axial hole through said rock-cutting drill from end to end arranged and adapted to convey a portion of the piston's actuating fluid directly from the cylinder to its cutting-point to blow out from the hole being drilled the rock-cuttings, and means for mingling a supply of water with said actuating fluid in said rock-cutting drill, substantially as described.

12. In a rock-drilling engine for expelling rock-cuttings from holes while drilling them, consisting of an operative drilling-engine having a rock-cutting drill arranged and adapted to extend into the cylinder of the drilling-engine and to be struck and actuated to cut rock by the reciprocative movements of the piston impinging against its inner end and in which the cutting drill has an axial hole from end to end, and the piston's actuating fluid is controllably supplied automatically to the axial hole in said rock-cutting drill and means for leading a supply of water under pressure into the axial hole in said drill-bit and for mingling the air and water together and for discharging them in the bottom of holes in rock while drilling them, substantially as described.

13. In a rock-drilling engine a rock-cutting drill arranged to be struck by the reciprocal movements of the piston, and provided with a projection, adjacent to its striking end, adapted to form a locking, securing and positive means for holding and rotating said drill-bit, and a passage axially through said cutting-drill arranged to conduct a portion of the piston's actuating fluid from the cylinder to the cutting-point of said rock-cutting drill, and a valve for controlling the supply of actuating fluid flowing to the drill-bit, substantially as described.

14. In a rock-drilling engine, a drill-bit arranged to project into the cylinder-head of the drilling-engine and arranged to be operatively struck upon its end by the reciprocal movement of the engine's piston and containing a passage in communication with said engine's cylinder and leading to said drill-bit's cutting-point, and a water passage or tube through said drilling-engine to said passage in said drill-bit, means to provide a suitable water supply for said passage and said drill-bit, whereby a commingled supply of the cylinder's actuating fluid and water is conveyed from said drilling-engine through said drill-bit to its cutting-point and to the bottom of holes in rock while drilling them, substantially as described, the piston extension, a wall separating the piston chamber from the drill-bit and through which said extension reciprocates.

15. In a rock-drilling engine, a suitable cylinder, a reciprocative piston, a suitable controlling-valve and a suitable feeding mechanism, a drill-bit arranged to project into said cylinder into the reciprocal path of said piston, and arranged and adapted to be struck directly on its cylinder-invading end by the reciprocal movements of said piston, and containing a passage or conduit for the actuating fluid of said rock-drilling engine, opening into or communicating with said engine's cylinder and extending through said drill-bit to or adjacent to its cutting-point, a water conveying tube or conduit connecting with the said passage or conduit in said drill-bit, means to provide a suitable water supply and to mingle with it a portion of the cylinder's actuating fluid, substantially as described, the piston extension, and a packing wall forming the outer head for the piston chamber and through which said piston extension reciprocates.

16. In a rock-drilling engine, the combination of the cylinder, the piston, the cylinder-heads, the chuck-sleeve, the chuck and the hollow drill, with a liquid or water conveying tube through said piston connected with said hollow drill and a valve-controlled passage from said cylinder adapted to allow a suitable supply of the cylinder's actuating fluid to flow into said hollow drill, whereby a combined stream of liquid and actuating fluid is caused to flow through said drill-bit to the bottom of holes while drilling them, and means, including a valve, for controlling the volume and pressure of said liquid and actuating-fluid stream, substantially as described.

17. In a rock-drilling engine the combination with the cylinder, of a piston having an extension hammer-bar, the front cylinder-head, the chuck-sleeve, the chuck, the chuck-ring and the cupped washers and rings surrounding said hammer-bar, with a hollow drill-bit held loosely by said chuck-sleeve and chuck, and arranged to be instantly withdrawn from or inserted in said chuck-sleeve and chuck, and provided with means for defining its operative position in said chuck-sleeve and chuck and to said cylinder and piston and with a fixed tube projecting from the rear end of said cylinder freely through said piston and extending into said drill-bit, substantially as described.

18. In a rock-drilling engine the combination with the cylinder and the piston, of a hollow drill-bit projecting into said cylinder into the reciprocating path of the piston and arranged to convey a portion of the piston's actuating fluid to the bottom of holes while drilling them, with a water-tube projecting into said drill-bit for supplying water under pressure and mingling it with the actuating fluid of said drill-bit and discharging into the bottom of holes while drilling them a combined stream of actuating fluid and water, and means for preventing the water from entering said cylinder, substantially as described.

19. In a rock-drilling engine the combination with the piston, the cylinder and the valve and chest, of the drill-bit, the supplementary cylinder-head, the rifle-bar and the rear cylinder-head having a water-inlet tube secured thereto and projecting therefrom loosely through the axial center of said rifle-bar and said piston into the striking end of said drill-bit, and an actuating-fluid passage leading from the valve-chest and cylinder to said drill-bit, substantially as described.

20. In a rock-drilling engine, the combination with the drill-bit, the cylinder, the valve-chest and valve, the piston and the rifle-bar, axial holes through said rifle-bar and piston, a water-inlet tube projecting loosely through said axial holes into said drill-bit adapted to conduct a stream of water under pressure through said tubes and drill-bit, a valve for controlling the flow of said water, and a valve-controlled actuating-fluid passage leading from said valve chest and cylinder into said drill-bit and means for preventing a harmful flow of water into said cylinder, substantially as described.

21. In a rock-drilling engine, the combination of a piston having a rifle-bar, a drill-bit having an axial hole through it, a cylinder having a water-conveying tube projecting through said rifle-bar and piston into said drill-bit, a water-passage to said tube, a valve adjacent to said tube for controlling said passage, means for mingling said water with a portion of the engine's actuating fluid, means for conducting said actuating fluid and water in a combined stream to the bottom of holes in rock while drilling them, and means for preventing a harmful flow of water into said cylinder, substantially as described.

22. In a rock-drilling engine the combination with the hollow drill-bit, of the chuck-sleeve, the chuck, the cylinder; the piston, having a hammer-bar extension; the rifle-bar and the rear cylinder-head having a water-inlet tube projecting through said rifle-bar and piston into said drill-bit, a passage around said tube from said cylinder into said drill-bit, and means, including cupped washers arranged to surround the piston's hammer-bar for preventing a harmful flow of water into said cylinder, substantially as described.

23. In a rock-drilling engine, the combination with the cylinder and the piston, of a hollow drill-bit mounted to be turned step by step by said piston, a water-inlet tube projecting into said drill-bit and a valve-controlled actuating-fluid passage from said cylinder into said drill-bit, substantially as described.

24. In a rock-drilling engine, the combination with the cylinder, the piston, the cylinder-head and the sleeve, of a hollow drill-bit projecting into said cylinder means for conveying a portion of the cylinder's actuating fluid to its cutting point, of a conduit adapted to convey a stream of water under pressure to said drill-point, a rear cylinder-head, a passage in said cylinder-head for said water, a valve adapted to control the admission and volume of said water, and a water-inlet coupling adapted to connect with a source of water-supply on either side of said cylinder, substantially as described, a wall separating the piston chamber from the drill bit, said means for conveying a portion of the cylinder's actuating fluid consisting of a conduit passing around said wall.

25. In a rock-drilling engine the combination with the piston having an axial hole, the drill-bit, the rifle-bar having an axial hole and the back cylinder-head carrying a water-inlet tube projecting through the axial bores of said rifle-bar and piston, with a water-inlet coupling rotatably mounted on said cylinder-head, a passage from said coupling to said tube and means, including a nut and thread for packing said coupling against leakage, substantially as described, said piston being provided with a hollow extension extending the said axial hole beyond the piston chamber.

26. In a rock-drilling engine, the combination of the hollow drill-bit, the piston, the rifle-bar, and the back cylinder-head, with a tube projecting loosely through bores in said rifle bar and piston, and with a water inlet coupling having a hose or pipe connecting nipple, and a passage from said coupling to said tube, substantially as described, said piston being provided with a hollow extension the bore of which communicates with the piston bore and extends beyond the piston chamber.

27. In a rock-drilling engine, the combination of the hollow drill-bit, the piston, the rifle-bar, and the back cylinder-head, with a tube projecting loosely through bores in said rifle-bar and piston, and with a water-inlet coupling having a hose or pipe connecting nipple, and a passage from said coupling to said tube, substantially as described, said piston being provided with a hollow hammer-bar extension the bore of which communicates with the piston bore and extends beyond the piston chamber.

28. In a rock-drilling engine, the combination of the supplementary cylinder-head, the rear cylinder head secured, thereto, the water-inlet tube, the rifle-bar revoluble on said tube, the piston arranged to reciprocate and turn on said tube, and the hollow drill-bit surrounding the discharging end of said tube, substantially as described, said piston being provided with a hollow extension inclosing said tube and extending beyond the piston chamber.

29. In a rock-drilling engine, the combination with the back cylinder-head of the water-inlet coupling rotatively mounted thereon, the washer at its sides and the tightening-nut, substantially as described, a rifle-bar, piston, and piston extension containing a hollow from the rear end of the rifle-bar to the forward end of the piston extension and a water-pipe extending into said hollow.

30. In a rock-drilling engine, the combination with the cylinder of the piston, the hollow drill-bit, the rifle-bar and the water-inlet tube projecting through said rifle-bar and piston into said drill-bit, with the back cylinder-head, the water-inlet passage therein, the water-inlet coupling and the valve for controlling said water-inlet passage, substantially as described, said piston having a hollow extension bar reciprocating through the front cylinder wall, and said water-inlet tube extending into said piston extension.

31. In a rock-drilling engine, the combination of the cylinder, the piston, the rifle-bar and the pawls, with the supplementary cylinder-head and back cylinder-head, the pawl trunnion-supporting ring, a water-inlet tube, a threaded hole in said cylinder and into said supplementary cylinder-head; a cap-screw in said threaded hole and an oil-hole leading from said cap-screw hole to said pawls and rifle-bar, substantially as described, said piston having an extension projecting through the front cylinder wall, and said water-inlet tube extending into the piston and piston extension to a point beyond the front cylinder wall.

32. In a rock-drilling engine, the combination of the cylinder and the piston, with the front cylinder-head having a drill-holding chuck rotatably mounted therein, and arranged to be turned step by step by said piston, a drill-bit operatively supported by said chuck and arranged to conduct a portion of the cylinder's actuating fluid and a stream of water from the engine's cylinder to its cutting-point, a chuck-sleeve surrounding said chuck, a collar on said chuck-sleeve, a ring mounted on said collar, a spring between said ring and an abutment in said cylinder-head, and means whereby the ring may be moved by the collar of said chuck-sleeve to compress said spring, substantially as described.

33. In a rock-drilling engine, the combination of the cylinder, the piston and the front cylinder-head, a rock-cutting drill-bit having projections near the end of its shank, a drill-bit-supporting mechanism consisting of a chuck comprising a cylindrical tube containing two oppositely-arranged slots in its forward end, a fluted axial hole in its opposite end, a hammer-bar extension to said piston, a fluted portion at its end fitting loosely in said fluted end of said chuck, projections on said chuck, means for rotatably supporting said chuck in said cylinder-head, a chuck-sleeve surrounding freely said chuck: stops on said chuck-sleeve arranged to engage said projections of said chuck, an end flange extending over the end of said chuck, and an oblong hole axially through the flanged end of said chuck sleeve, adapted to fit loosely said drill-shank and lugs, substantially as described.

34. In a rock-drilling engine, the combination of the cylinder, the piston, the front and rear cylinder-heads, the rifle-bar-rotating mechanism and the feed mechanism, with a water-conveying tube projecting from the rear cylinder-head through said rifle-bar and piston, a drill-holding chuck and chuck-sleeve, revolubly mounted in said cylinder-head; an axial bore through said sleeve and chuck, a drill-bit operatively supported by said sleeve and chuck, and arranged to be operatively rotated step by step by said piston and chuck, and provided with a conduit or passage communicating with said cylinder and with the discharge end of said water-conveying tube and arranged and adapted to convey a combined and commingled stream of water and actuating fluid to the cutting-point of said drill-bit, and having said drill-bit project into the reciprocal path of said piston and arranged to be impinged by said piston, a collet loosely mounted on said chuck-sleeve, a ring mounted on said collet, a spring arranged between said ring and an abutment in said cylinder-head, substantially as described.

35. In a rock-drilling engine, the combination of the cylinder, and the front cylinder-head, of a piston in said cylinder having an extended bar adapted to strike on the shank end of a rock-cutting drill-bit and a series of flutes cut around said bar, a drill-holding chuck mounted loosely on the fluted portion of said bar, a rock-cutting drill-bit, means for removably securing said drill-bit to said chuck, and means for rotating said piston and chuck and rock-cutting drill-bit, substantially as described.

36. In a rock-drilling engine, the combination of the cylinder and the front cylinder-head, with a rock-cutting drill-bit, a drill-holding chuck, arranged to hold the drill loosely and in such a manner that it can be instantly inserted or removed from said chuck, manually, a piston in said cylinder having a hammer-bar extension adapted to strike the shank end of said drill-bit, means for rotating said piston step by step and means for rotating said drill-bit step by step from said piston, substantially as described.

37. In a rock-drilling engine the combination of the cylinder and the cylinder-head, with the manually-operating drill-bit-holding chuck, a piston having a hammer-bar extension; cupped washers mounted on said hammer-bar, a ring between said cupped washers, a ring on the outside of each cupped washer, a rubber buffer-ring at the side of one ring and means for compressing the cupped washers around said hammer-bar, substantially as described.

38. In a rock-drilling engine the combination of the cylinder and the drill-bit manually-operating chuck, the piston arranged to strike said drill-bit; means for rotating said piston and drill-bit and means including a spring for cushioning the blow of the piston on the drill-bit when the drill-bit is out of cutting relation to rock, substantially as described.

39. In a rock-drilling engine the combination with the cylinder, the piston and the front cylinder-head, of the hollow drill-bit and the drill-chuck and sleeve, means including a rifle-bar for rotating said drill-bit step by step, means including a hand-operating device for securing said drill-bit instantly to or for removing it instantly from said drill-holding chuck, means including a spring for cushioning the spent blow of the piston against said drill-bit, means including a water-conveying tube and a water-supply system under pressure for delivering a supply of water into said drill-bit, means including air-passages for delivering a suitable supply of actuating fluid into the water and in said drill-bit, means including packing-rings for keeping the water out of said cylinder and means for operating and oiling the moving parts of said drilling-engine, substantially as described.

40. In a rock-drilling engine, the combination with the cylinder, the piston and its extending hammer-bar, of the rifle-bar and pawls, and valved water-conveying tube, the water-inlet coupling, the cylinder-head and the drill-holding chuck members arranged to be rotated by said piston, the hollow drill-bit supported by said chuck mechanism, the valve-controlled actuating-fluid passages leading to said hollow drill-bit, the buffer-ring and the cupped washers and their supporting-rings surrounding said hammer-bar, substantially as described.

41. In a rock-drilling engine the combination with the cylinder and the piston, of the front cylinder-head, the drill-holding chuck and chuck-sleeve, the drill-bit having the projecting lugs, the slots in the chuck in which said lugs are confined, and the end flange on the chuck-sleeve for confining the lugs to the slots of the chuck, substantially as described.

42. In a rock-drilling engine the combination of an operative cylinder, an operative valve mechanism, a piston arranged to rotate step by step as it reciprocates in said cylinder and a suitable feed mechanism, with a drill-bit loosely and unclampably supported operatively by said drilling engine and arranged to be impinged against by said piston, and adapted to be rotated step by step by said piston, and containing a passage throughout its length, passages controlled by an automatically-operating valve, arranged to convey a portion of the piston's actuating fluid into said drill-bit, a valved water-conveying tube extending through said piston, means for providing a supply of water under pressure to said tube, and communicating with the passage in said drill-bit and means for excluding the water from said cylinder, substantially as described.

43. In a rock-drilling engine the combination with the valve-chests, the valve and the cylinder, of the piston having a circumferential groove centrally of its length, actuating-fluid ports leading from said valve-chest to the ends of said cylinder, open passages leading from the main air-inlet port of said valve to its opposite ends, ports or passages leading from the opposite ends of said valve-chest to a position in the cylinder where they will register with the said annular groove in said piston during its reciprocative movements, and having the port contain independent passages placed at a short distance apart and means for closing the passage nearest the center of the cylinder, and ports leading from the path of travel of the central part of said piston to the atmosphere, substantially as described.

44. In a rock-drilling engine the combination with the valve-chest and valve and the cylinder of ports arranged to coöperate with the reciprocal movements of the piston and with a circumferential port therein to automatically operate and cushion the piston and means comprising two separated outlets leading into said cylinder, from the front port of said cylinder, a pin for closing the port nearest the center of the cylinder and a hole in the cylinder in which to keep the pin when in disuse, whereby the opening of the valve in the forward or striking-blow end of the piston is retarded and a harder blow is struck, substantially as described.

45. In a rock-drilling engine the combination of the valve-chest, the valve, the cylinder and the piston, of a circumferential groove around the piston slightly near its forward or drill-striking end, ports leading from said valve-chest into said cylinder and from said cylinder to the atmosphere, and arranged to automatically operate the valve and piston, and means comprising two independent and separate outlets for the port leading into the front end of the cylinder, and means at the control of the operator for closing the outlet of these two outlets of this port that is positioned nearest to the center of the cylinder, whereby two different strengths of blows may be struck by the piston at the will of the operator, substantially as described.

46. In a rock-drilling engine, the combination with the cylinder, the cylinder-head and the piston, of a drill-bit arranged to be struck by said piston and having lugs, shoulders or projections adjacent to its shank end, a drill-holding chuck containing an axial bore adapted to receive the shank of said drill-bit and lateral recesses radiating from said bore adapted to receive the lugs of said drill-bit; a sleeve rotatably mounted on said chuck and extending beyond the end of said cylinder-head far enough to be grasped by the hand of an operator, and containing a flanged end extending down over the end of said chuck; an oblong aperture in the end of said chuck-sleeve arranged to admit the shank and lugs of said drill-shank to pass through said flange into said chuck, when said chuck-sleeve is manually turned to bring its drill-shank-receiving aperture in line with the chuck's drill-shank-receiving aperture and having said chuck-sleeve arranged to be partially rotated manually on said chuck after the drill-shank is admitted to the chuck to a position in which its drill-shank-receiving aperture will stand crosswise or at substantially right angles to the drill-shank-receiving aperture of the chuck, and means including stops or abutting surfaces for locking said chuck-sleeve's drill-shank-receiving aperture in its crossed or right-angled position relative to the drill-receiving aperture of said chuck, substantially as described.

In testimony whereof I affix my signature in presence of two witnesses.

JOHN GEORGE LEYNER.

Witnesses:
FRED S. OVERTON,
ALICE C. BROBSTROM.

Copies of this patent may be obtained for five cents each, by addressing the "Commissioner of Patents, Washington, D. C."

Correction in Reissue Letters Patent No. 13,614.

It is hereby certified that in Reissue Letters Patent No. 13,614, granted September 9, 1913, upon the application of John George Leyner, of Denver, Colorado, for an improvement in "Rock-Drilling Engines," an error appears in the printed specification requiring correction as follows: Page 8, line 61, strike out the article "a"; and that the said Letters Patent should be read with this correction therein that the same may conform to the record of the case in the Patent Office.

Signed and sealed this 14th day of October, A. D., 1913.

[SEAL.]

R. T. FRAZIER,

*Acting Commissioner of Patents*